United States Patent
Liu

(10) Patent No.: US 10,459,754 B2
(45) Date of Patent: Oct. 29, 2019

(54) METHOD, APPARATUS, AND SYSTEM FOR DISCOVERING APPLICATION TOPOLOGY RELATIONSHIP

(71) Applicant: HUAWEI TECHNOLOGIES CO., LTD., Shenzhen, Guangdong (CN)

(72) Inventor: Ting Liu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/786,159

(22) Filed: Oct. 17, 2017

(65) Prior Publication Data

US 2018/0121226 A1    May 3, 2018

Related U.S. Application Data

(63) Continuation of application No. PCT/CN2015/098125, filed on Dec. 21, 2015.

(51) Int. Cl.
   *G06F 9/455* (2018.01)
   *G06F 9/54* (2006.01)
   (Continued)

(52) U.S. Cl.
   CPC ...... *G06F 9/45558* (2013.01); *G06F 9/45533* (2013.01); *G06F 9/541* (2013.01);
   (Continued)

(58) Field of Classification Search
   None
   See application file for complete search history.

(56) References Cited

U.S. PATENT DOCUMENTS

| 7,099,580 B1 | 8/2006 | Bulbul |
| 7,774,446 B2 * | 8/2010 | Nedelcu ................ H04L 41/12 709/223 |

(Continued)

FOREIGN PATENT DOCUMENTS

| CN | 101278274 A | 10/2008 |
| CN | 102137007 A | 7/2011 |

(Continued)

OTHER PUBLICATIONS

Velcbo, "Linux log system composition", Red Union Linux, Jun. 13, 2014, with an English translation, total 23 pages.

*Primary Examiner* — Tammy E Lee
(74) *Attorney, Agent, or Firm* — Womble Bond Dickinson (US) LLP

(57) ABSTRACT

A method for discovering an application topology relationship provided by this application, in a packet transmission process, API calling information is recorded, and a topology discovery server determines, by analyzing collected API calling information, whether interaction exists between virtual machines in a virtual machine cluster. By using the foregoing analysis manner, the topology discovery server may further determine interaction frequency that is between virtual machines and to which the collected API calling information relates, and determine an application topology relationship between the virtual machines according to the interaction frequency of the virtual machines. The foregoing solution provides a method for discovering an application topology relationship between virtual machines in a virtualization scenario, where an application topology relationship between virtual machines is determined by analyzing API calling information generated in a packet transmission process, and therefore complexity of the solution is relatively low.

14 Claims, 12 Drawing Sheets

(51) Int. Cl.
  *G06F 11/30* (2006.01)
  *G06F 11/34* (2006.01)
  *H04L 12/24* (2006.01)
  *H04L 12/26* (2006.01)
  *H04L 29/08* (2006.01)

(52) U.S. Cl.
  CPC ........ *G06F 11/301* (2013.01); *G06F 11/3409* (2013.01); *G06F 11/3419* (2013.01); *H04L 41/12* (2013.01); *G06F 2009/45591* (2013.01); *G06F 2009/45595* (2013.01); *H04L 43/18* (2013.01); *H04L 67/10* (2013.01)

(56) References Cited

U.S. PATENT DOCUMENTS

| | | |
|---|---|---|
| 2007/0076630 A1 | 4/2007 | Horton et al. |
| 2011/0307889 A1 | 12/2011 | Moriki et al. |
| 2013/0219057 A1 | 8/2013 | Li et al. |
| 2013/0290955 A1* | 10/2013 | Turner ............... H04L 41/12 718/1 |
| 2014/0165054 A1* | 6/2014 | Wang ............... G06F 9/45558 718/1 |
| 2014/0201642 A1 | 7/2014 | Vicat-Blanc |
| 2015/0127807 A1 | 5/2015 | Billore et al. |
| 2015/0127815 A1 | 5/2015 | Billore et al. |
| 2015/0244617 A1 | 8/2015 | Nakil et al. |
| 2015/0358235 A1 | 12/2015 | Zhang et al. |
| 2016/0062782 A1* | 3/2016 | Liu ............... G06F 9/45558 718/1 |

FOREIGN PATENT DOCUMENTS

| | | |
|---|---|---|
| CN | 102306156 A | 1/2012 |
| CN | 102082692 B | 10/2012 |
| CN | 103281248 A | 9/2013 |
| CN | 104468219 A | 3/2015 |
| CN | 104618246 A | 5/2015 |
| CN | 104639406 A | 5/2015 |

* cited by examiner

METHOD, APPARATUS, AND SYSTEM FOR DISCOVERING APPLICATION TOPOLOGY RELATIONSHIP

CROSS-REFERENCE TO RELATED APPLICATIONS

This application is a continuation of International Application No. PCT/CN2015/098125, filed on Dec. 21, 2015, the disclosure of which is hereby incorporated by reference in its entirety.

TECHNICAL FIELD

The present disclosure relates to the field of information technology, and in particular, to a method, an apparatus, and a system for discovering application topology relationships.

BACKGROUND

With the coming of the information era, relying on a computer network makes reliability of operating the computer network significantly important, and a higher requirement is imposed on network management. According to a definition of an open system interconnection (OSI), there are mainly five functional domains for network management: fault management, configuration management, performance management, security management, and accounting management. Among the five functional domains, configuration management is a basis, and main functions of configuration management include discovering a network topology structure, and monitoring and managing a configuration status of a network device. All other functions are based on the network topology structure. Network topology discovery is performed for an end-to-end connection relationship in a network, and a main objective is to obtain and maintain existence information of network nodes and connection relationship information of the network nodes, and draw a topology diagram of the entire network based on the existence information and the connection relationship information.

As a specific form of a network topology, an application topology (Application Topology) in an IT system is a network communication relationship between virtual machines, and network communication between the virtual machines is generated based on applications run by the virtual machines. More specifically, the application topology is a deployment relationship of application components (such as a program, a service, a component, and a virtual machine running the application) in hosts (such as servers) in the IT system and an interaction relationship (such as a service request and response) between the deployed application components.

Existing application topology discovery is active detection discovery. Active detection is an action of studying an application structure and an application user by sending a related detection data packet to a network target, and observing, recording and returning a result. Because a large amount of data needs to be sent to a network, load in the network is increased, and accuracy of topology discovery is low.

SUMMARY

This application describes a method, an apparatus, and a system for discovering an application topology relationship, and provides an application topology discovery solution for a virtualization environment, so as to reduce complexity of establishing an application topology relationship between virtual machines.

According to one aspect, this application provides a method for discovering an application topology relationship, where the method includes: collecting at least two sets of API calling information, where each set of API calling information corresponds to one API call, and each set of API calling information includes an identifier of a virtual machine corresponding to the API call, an occurrence time of the API call, and a packet flow direction of the API call; analyzing the foregoing collected API calling information, and determining first API calling information and second API calling information that meet a first condition, where that the first API calling information and the second API calling information meet the first condition includes: a packet flow direction in the first API calling information and a packet flow direction in the second API calling information are mutually opposite, and a difference between an occurrence time of an API call in the first API calling information and an occurrence time of an API call in the second API calling information is less than or equal to a predetermined threshold; as meeting the first condition means that one time of interaction exists between two virtual machines in the first API calling information and the second API calling information, determining whether interaction frequency of a first virtual machine indicated by the first API calling information and a second virtual machine indicated by the second API calling information meets a second condition; and if the interaction frequency of the first virtual machine and the second virtual machine meets the second condition, determining that an application topology relationship exists between the first virtual machine and the second virtual machine.

According to the method for discovering an application topology relationship provided by this application, API calling information in a packet transmission process is collected, and whether interaction exists between two virtual machines corresponding to two sets of API calling information is determined by matching whether the two sets of API calling information meet a first condition. By using the foregoing manner, a topology discovery server may determine interaction frequency, involved in the collected API calling information, of virtual machines, and an application topology relationship between the virtual machines is determined according to the interaction frequency of the virtual machines. The foregoing solution provides a method for discovering an application topology relationship between virtual machines in a virtualization scenario, where an application topology relationship between virtual machines is determined by analyzing API calling information generated in a packet transmission process, and therefore, complexity of the solution is relatively low.

In a possible implementation manner, in addition to the packet flow directions and the difference between the occurrence times of the API calls, communications protocols involved by the API calls also need be considered. Specifically, each set of API calling information further includes a communications protocol; and correspondingly, that the first API calling information and the second API calling information meet the first condition further includes: a communications protocol in the first API calling information and a communications protocol in the second API calling information are the same. That is, only when the communications protocols in the two sets of API calling information are the same, an application topology relationship may exist between two virtual machines corresponding to the two sets of API calling information; and when the communications protocols in the two sets of API calling information are different, even though requirements on the packet flow directions and the difference between the occurrence times of the API calls are met, it is still cannot be considered that interaction exists between the two virtual machines corresponding to the two sets of API calling information. Accuracy of identifying interaction between virtual machines is improved by specifying communications protocols at a packet transmit end and a packet receive end.

In a possible implementation manner, the determining whether interaction frequency of the first virtual machine and the second virtual machine meets a second condition includes: analyzing at least two sets of API calling information in the first virtual machine and at least two sets of API calling information in the second virtual machine, determining the interaction frequency of the first virtual machine and the second virtual machine, comparing the interaction frequency with predetermined frequency, and when the interaction frequency is greater than the predetermined frequency, determining that the interaction frequency meets the second condition. By using the predetermined frequency as a basis for determining whether an application topology relationship exists between virtual machines, persons skilled in the art may adjust the foregoing predetermined frequency to control strictness of determining an application topology relationship. The predetermined frequency may also be set according to a requirement, which is not limited by an embodiment.

In a possible implementation manner, before the comparing the interaction frequency with predetermined frequency, the method further includes: determining whether the first virtual machine and the second virtual machine are in a same network segment, and when the first virtual machine and the second virtual machine are in the same network segment, correcting one of the interaction frequency or the predetermined frequency according to a predetermined weighting coefficient; and the comparing the interaction frequency with predetermined frequency includes: comparing corrected interaction frequency with the predetermined frequency; or comparing the interaction frequency with corrected predetermined frequency.

In a possible implementation manner, a topology discovery server may determine, in at least the following two manners, whether the first virtual machine and the second virtual machine are in a same network segment:

manner 1: determining whether an IP address of the first virtual machine and an IP address of the second virtual machine are in the same network segment; and manner 2: determining whether a Virtual eXtensible Local Area Network (VXLAN) identifier of the first virtual machine and a VXLAN identifier of the second virtual machine are the same, where if the two identifiers are the same, it indicates that the first virtual machine and the second virtual machine are in the same network segment.

It is more possible for virtual machines in a same network segment to have an application topology relationship than for virtual machines in different network segments. Therefore, in an embodiment, weighting is performed on interaction frequency of virtual machines in a same network segment or predetermined frequency is reduced, to increase accuracy of discovering an application topology relationship.

In a possible implementation manner, in a process of sending a packet from the first virtual machine to the second virtual machine, API calling information may be stored in a log file in a deployed host of the first virtual machine and the second virtual machine, and the topology discovery server reads the API calling information from the log file. Alternatively, an agent module is installed in each host, and the topology discovery server receives API calling information reported by the agent module of the host.

In a possible implementation manner, in a packet transmission process, API calling information may be written into a log file in the following manners:

when a virtual machine calls an API to send a packet to a VMM in which the virtual machine is located, writing, by the virtual machine, a virtual switch in the VMM, or the VMM, API calling information into a log file in a deployed host of the virtual machine;

monitoring, by an agent module in the deployed host of a virtual machine, a transmission process of a packet in the host, and writing API calling information corresponding to an API call in the transmission process into a log file in the deployed host of the virtual machine;

receiving, by an agent module in the deployed host of a virtual machine, API calling information that corresponds to an API call in a packet transmission process in the host and that is sent by the virtual machine, a virtual switch, or a VMM, and writing the received API calling information into a log file of the deployed host of the virtual machine; or when a VMM of a virtual machine calls an API to send a packet to the virtual machine, writing, by any one of the virtual machine, a virtual switch in the VMM, or the VMM, API calling information into the log file in the deployed host of the virtual machine.

Specifically, any one of the virtual machine, the virtual switch, or the VMM in the host may report the API calling information to the agent module by calling a topology information report API function.

In a possible implementation manner, an agent module is installed in each host, and is configured to collect API calling information in the host; and the agent module may monitor a virtual machine, a virtual switch, and a VMM in the host, obtain API calling information, and write the obtained API calling information into a log file; or, after obtaining API calling information, the agent module reports the API calling information to the topology discovery server.

In a possible implementation manner, the API call includes an input API function call and an output API function call. Specifically, a VMM in which a virtual machine is located calls an output API function to send a packet to the virtual machine; and the virtual machine calls an input API function to send a packet to the VMM in which the virtual machine is located.

In a possible implementation manner, the API calling information may further includes an identifier of a source virtual machine and an identifier of a destination virtual machine; in this case, it may be learned, according to one set of API calling information, that one time of interaction exists between the source virtual machine and the destination virtual machine.

Further, in terms of a virtual machine cluster in a system, the topology discovery server determines an application topology relationship between virtual machines in the virtual machine cluster, and generates an application topology view of the virtual machine cluster.

The topology discovery server is an independent physical server; or the topology discovery server is jointly disposed, in a form of a functional module, with other physical servers in the system.

In a possible implementation manner, virtual machines in a specific application topology relationship may run on a same host or on different hosts. When the virtual machines run on different hosts, two hosts transmit the packet through an external physical network. In a specific transmission method, various existing network transmission protocols and transmission settings may be used, and this application imposes no limitation on an transmission network structure.

According to another aspect, an embodiment provides another method for discovering an application topology relationship. A difference from the foregoing method for application topology relationship discovery lies in that, an identifier of a virtual machine in each set of API calling information recorded in this embodiment includes both an identifier of a source virtual machine at a packet transmit end and an identifier of a destination virtual machine at a packet receive end. In this case, it is determined, according to one set of API calling information, that one time of interaction exists between two virtual machines. Specifically, API calling information is obtained, where the API calling information includes an identifier of a source virtual machine and an identifier of a destination virtual machine, and the API calling information corresponds to one API call; it is determined that one time of interaction exists between the source virtual machine and the destination virtual machine; and collected API calling information is analyzed, and it is determined, according to interaction frequency of the first virtual machine and the second virtual machine, that an application topology relationship exists between the first virtual machine and the second virtual machine.

According to still another aspect, an embodiment provides a topology discovery server, where the topology discovery server specifically implements functions of the foregoing methods. The functions may be implemented by using hardware, or may be implemented by executing corresponding software by using hardware. The hardware or software includes one or more modules corresponding to the foregoing functions.

In a possible design, a structure of the topology discovery server includes a processor and a memory, where the processor is configured to support the topology discovery server in implementing corresponding functions in the foregoing methods. The topology discovery server may further include the memory, where the memory is configured to be coupled with the processor, and store a program instruction and data that are required by the topology discovery server to implement the foregoing functions.

According to yet another aspect, an embodiment provides a system for discovering an application topology relationship, including a topology discovery server and at least one host, where multiple virtual machines run on the at least one host, and the topology discovery server determines, by obtaining API calling information generated when an API is called in a packet transmission process, whether an application topology relationship exists between two virtual machines. Specifically, the topology discovery server, the virtual machines, an agent module, and the like implement functions in the method for discovering an application topology relationship in the first aspect. The functions may be implemented by using hardware, or may be implemented by executing corresponding software by using hardware. The hardware or software includes one or more modules corresponding to the foregoing functions.

Optionally, the system for executing the method for discovering an application topology relationship may further include a database, where the database is configured to store the application topology relationship and an application topology view. The system may further include a management node, where the management node manages virtual machines according to an application topology relationship between the virtual machines, so as to improve management efficiency.

In a possible design, the host includes a processor and a memory, where the processor is configured to support the host in implementing corresponding functions in the foregoing system. The host may further include the memory, where the memory is configured to be coupled with the processor, and store a program instruction and data that are required by processor to implement the foregoing functions.

According to still yet another aspect, an embodiment provides a computer storage medium, where the computer storage medium is configured to store a computer software instruction used by the foregoing topology discovery server, and includes a program designed to implement the foregoing functions.

According to a further aspect, an embodiment provides a computer storage medium, where the computer storage medium is configured to store a computer software instruction used by the foregoing host, and includes a program designed to implement the foregoing functions.

According to the method, the apparatus, and the system for discovering an application topology relationship provided by this application, API calling information in a packet transmission process is collected, and whether interaction exists between two virtual machines corresponding to two sets of API calling information is determined by matching whether the two sets of API calling information meet a first condition. By using the foregoing manner, a topology discovery server may determine interaction frequency, involved in the collected API calling information, of virtual machines, and an application topology relationship between the virtual machines is determined according to the interaction frequency of the virtual machines. The foregoing solution provides a method for discovering an application topology relationship between virtual machines in a virtualization scenario, where an application topology relationship between virtual machines is determined by analyzing API calling information generated in a packet transmission process, and therefore, complexity of the solution is relatively low.

BRIEF DESCRIPTION OF DRAWINGS

To describe the technical solutions in the embodiments more clearly, the following briefly describes the accompanying drawings required for describing the embodiments. The accompanying drawings in the following description merely show some embodiments, and persons of ordinary skill in the art can derive other implementations from the accompanying drawings.

DESCRIPTION OF EMBODIMENTS

A network architecture and a service scenario described in the embodiments are used to describe the technical solutions of the embodiments more clearly and do not constitute a limitation on the technical solutions provided by the embodiments. Persons of ordinary skill in the art may know that, with evolution of the network architecture and occurrence of new service scenarios, the technical solutions provided by the embodiments are also applicable to similar technical problems.

Embodiments provide a method, an apparatus, and a system for discovering an application topology relationship between virtual machines in a virtualization environment, which can accurately identify an application topology relationship between virtual machines in a virtual machine cluster. Specifically, the embodiments provide a topology discovery server configured to collect Application Programming Interface (API) calling information used in communication between virtual machines in each host. The topology discovery server analyzes the API calling information collected from each host and generates an application topology relationship between the virtual machines.

Figure 1A:
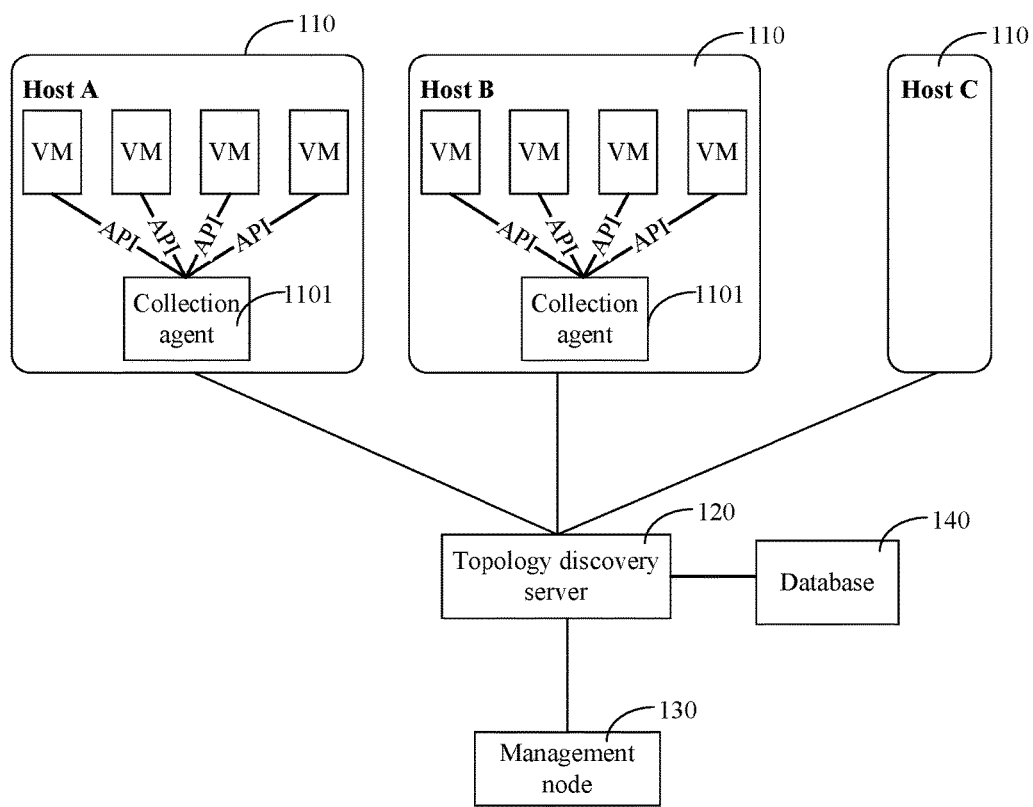
FIG. 1A is a schematic architecture diagram of a possible virtualization system according to an embodiment.

As shown in FIG. 1A, FIG. 1A is a schematic architecture diagram of a virtualization system according to an embodiment. A topology discovery server 120 is connected to each host 110, and is configured to collect API calling information on the host 110. The topology discovery server 120 may further store an application topology relationship between virtual machines in a database. When a management node 130 needs to perform a management operation according to the application topology relationship between the virtual machines, the management node obtains the application topology relationship between the virtual machines. Specifically, functions of each component shown in FIG. 1A are described as follows:

Each host 110 is a physical server, and several virtual machines run on the host.

Collection agent 1101: A collection agent (Collect Agent) 1101 is deployed on a host 110, and is configured to collect API calling information generated when each virtual machine, a virtual switch, or Virtual Machine Monitor (VMM) in the host transmits a packet. The collection agent 1101 sends the collected API calling information to the topology discovery server (Topology Discovery Server) 120, and the topology discovery server 120 analyzes the collected API calling information, so as to finally obtain an application topology relationship between virtual machines. The collection agent may monitor the virtual machines, the virtual switch, or the VMM in the host 110, and record API calling information when it is found that a packet is sent or received; or the virtual machine, the virtual switch, or the VMM reports API calling information to the collection agent after sending or receiving a packet.

In an example, after collecting the API calling information, the collection agent 1101 may send the collected API calling information to the topology discovery server 120 periodically or at an appropriate time (for example, when the host or a network is idle).

In another example, the collection agent 1101 may actively push the API calling information to the topology discovery server 120, or push the API calling information to the topology discovery server 120 after passively receiving a request from the topology discovery server 120. Alternatively, the collection agent 1101 saves the API calling information in storage space shared with the topology discovery server 120, and the topology discovery server 120 autonomously reads the API calling information.

It should be noted that this embodiment imposes no limitation on a specific transmission manner of the API calling information between the collection agent 1101 and the topology discovery server 120, as long as the topology discovery server 120 can obtain the API calling information from each host 110.

It should be further noted that the foregoing collection agent 1101 is optional, and when no collection agent is in the host, the virtual machine, the virtual switch, or the VMM may report the API calling information to the topology discovery server 120 in a manner similar to that used by the collection agent 1101.

Topology discovery server 120: The topology discovery server 120 collects API calling information from each host 110 connected to the topology discovery server 120, analyzes the collected API calling information, to obtain an application topology relationship between virtual machines, and stores the application topology relationship in a database. Further, the topology discovery server 120 may generate an application topology view according to the obtained application topology relationship between the virtual machines.

Each set of API calling information includes: an identifier of a virtual machine, an occurrence time of an API call, and a packet flow direction. The identifier of the virtual machine is an identifier of a virtual machine that receives or sends a packet. The occurrence time of the API call is a time at which the API call is performed. The packet flow direction includes input or output, where the input refers to that a packet is sent from a virtual machine to a VMM, and the output refers to that a packet is output from a VMM to a virtual machine. In an example, the occurrence time of the API call may further be a time at which a log is recorded, duration of the entire call, or a time at which the occurrence of the call is monitored. Each set of API calling information may further include a communications protocol, and the communications protocol is a communications protocol used when the virtual machine performs communication. The communications protocol may be the HyperText Transfer Protocol (HTTP), the User Datagram Protocol (UDP protocol), the Transmission Control Protocol/Internet Protocol (TCP/IP protocol), and the like. The identifier of the virtual machine may be an IP address of the virtual machine. For example, the API calling information is (VM1, t1, P1, In), which indicates that a VM1 calls an input function at a time t1 by using a protocol P1 to transmit a packet to a virtual switch VSwitch or a VMM. The API calling information is (VM2, t2, P2, Out), which indicates that a virtual switch or a VMM calls an output function at a time t2 by using a protocol P2 to transmit a packet to a VM2.

It should be noted that, when the host 110 uses a network interface card straight-through solution, a packet is transmitted from a VMM to a physical network interface card rather than through a virtual switch.

The topology discovery server 120 analyzes the API calling information collected from each host 110, identifies interaction frequency of virtual machines, and determines an application topology relationship between the virtual machines.

In an example, an API targeted by the API calling information is an input API function and an output API function.

In an example, a source virtual machine sends a packet to a destination virtual machine. When a protocol used by the source virtual machine to send the packet is the same as a protocol used by the destination virtual machine to receive the packet, and a time Ts for which the source virtual machine calls an API to send the packet and a time Te for which the destination virtual machine receives an API call of the packet are within an acceptable customized predetermined threshold, it is considered that one time of interaction occurs between the source virtual machine and the destination virtual machine. Further, in a period of time, if interaction frequency of two virtual machines is greater than predetermined frequency, it is determined that an application topology relationship exists between the two virtual machines.

Exemplarily, the following shows examples of API calling information collected by the topology discovery server in this application:

| | |
|---|---|
| VM1, Time1, protocol, In; | VM1', Time1', protocol, Out; |
| VM2, Time2, protocol, In; | VM2', Time2', protocol, Out; |
| ... | ... |
| VMn, Timen, protocol, In; | VMn', Timen', protocol, Out; |

The topology discovery server 120 analyzes the foregoing API calling information, and determines first API calling information and second API calling information that meet a first condition, where that the first API calling information and the second API calling information meet the first condition includes: a packet flow direction in the first API calling information and a packet flow direction in the second API calling information are mutually opposite, and a difference between an occurrence time of an API call in the first API calling information and an occurrence time of an API call in the second API calling information is less than or equal to a predetermined threshold; as meeting the first condition means that one time of interaction exists between two virtual machines in the first API calling information and the second API calling information, further determines whether interaction frequency of a first virtual machine indicated by the first API calling information and a second virtual machine indicated by the second API calling information meets a second condition; and if the interaction frequency of the first virtual machine and the second virtual machine meets the second condition, determines that an application topology relationship exists between the first virtual machine and the second virtual machine.

The foregoing analysis process provides a method in which the topology discovery server 120 determines an application topology relationship between virtual machines according to API calling information. Specifically, when a communications protocol is considered, the analysis process may be summarized into the following three determining processes:

manner 1: determining that packet flow directions in the two sets of API calling information are respectively input and output;

manner 2: determining that communications protocols in the two sets of API calling information are the same; or manner 3: determining that the difference between the occurrence times of the API calls in the two sets of API calling information is less than or equal to the predetermined threshold (namely the foregoing second condition).

The foregoing three determining processes are expressed as follows in a programming language:

If(Protocol=Protocol && |(Time1−Time1')|<T && In⇔Out)

Then one instance of interaction occurs between VM1 and VM1'.

It should be noted that this embodiment may implement the foregoing three determining processes in a different sequence according to a requirement. Exemplarily, when no communications protocol is considered, in terms of collected API calling information, the topology discovery server 120 may first screen the API calling information according to an occurrence time of an API call, select API calling information meeting manner 3 of determining, further screen out API calling information meeting manner 1 of determining, and determine interaction frequency, of virtual machines between which an interaction relationship exists, in the finally screened-out API calling information, so as to determine an application topology relationship between the virtual machines.

Still further, when a virtual machine cluster uses a same communications protocol or most virtual machines in a virtual machine cluster use a same communications protocol to perform communication, the foregoing API calling information may not include the communications protocol. Correspondingly, the topology discovery server 120 does not need to determine whether communications protocols in the two sets of API calling information are the same. In this case, efficiency of discovering an application topology relationship is improved, and accuracy may be reduced.

In an example, the threshold in manner 3 of determining may be set according to a requirement. Specifically, an actual network load status may be considered, which is not limited by this embodiment.

The topology discovery server traverses the collected API calling information, to obtain interaction frequency of any two virtual machines. When the interaction frequency is greater than a predetermined interaction frequency, it is considered that an application topology relationship exists between the two virtual machines. The topology discovery server 120 stores the application topology relationship between the virtual machines in a database 140. It should be noted that the topology discovery server 120 may traverse API calling information of an API call occurring in a period of time, and use an obtained times of interaction between the virtual machines as the interaction frequency, the period of time may be set according to a requirement. Correspondingly, the predetermined frequency may also be set according to a requirement, which is not limited by this embodiment.

It should be noted that an error may detected when interaction between the virtual machines is calculated in the foregoing manner. For example, in a case in which the protocol is not considered, if a virtual machine a calls an input API function at a time t1 to send a packet to a VMM, and a destination virtual machine of the packet is a virtual machine b, recorded API calling information is (a, t1, in). The virtual machine b receives, at a time t2, the packet that is from the virtual machine a and is forwarded by the VMM, and recorded API calling information is (b, t2, out). A virtual machine c receives, at the time t2, a packet that is from a virtual machine X and is forwarded by the VMM, and recorded API calling information is (b, t2, out). A difference between t1 and t2 is less than a predetermined interval, according to the foregoing rule, it can be learned that one time of interaction exists between the virtual machine a and the virtual machine b; and one time of interaction exists between the virtual machine a and the virtual machine c. Apparently, in this case, since the packet of the virtual machine c is from the virtual machine X, no interaction exists between the virtual machine a and the virtual machine c.

It should be noted that, in an actual product implementation scenario, when there are a large quantity of packet exchanges between virtual machines, the foregoing error is relatively small, and does not cause apparent impact on an application topology relationship between enormous virtual machines. Therefore, the foregoing error is acceptable.

It should be further noted that, in some cases, identifiers of virtual machines in the API calling information may all include an identifier of a source virtual machine and an identifier of a destination virtual machine. In this case, theoretically, it can be determined, by recording one set of API calling information, that one time of interaction exists between the source virtual machine and the destination virtual machine. In this application, to ensure calculation efficiency, whether the API calling information includes identifiers of two parties in communication or only an identifier of one party in communication, whether interaction exists between virtual machines can be determined in this application according to the foregoing analysis method. That is, in terms of API calling information whose packet flow direction is input, in some implementations only the identifier of the source virtual machine in the API calling information is used. In terms of API calling information whose packet flow direction is output, in some implementations only the identifier of the destination virtual machine in the API calling information is used. With regard to two types of API calling information formats, whether interaction exists between virtual machines is determined according to the foregoing three determining processes without a need to separately perform calculation for the two types of API calling information formats, so that analysis efficiency can be effectively improved.

Management node 130: A management node 130 may be a functional entity, such as VMware Vcenter and Fusion-Manager, which needs to obtain a network topology of a virtual machine. The management node 130 reads an application topology relationship from the topology discovery server or the foregoing database.

In an example, the topology discovery server 120 may be an independent physical server, or the topology discovery server 120 serves as a functional module and is jointly disposed with other physical servers, such as the management node 130.

Figure 1B:
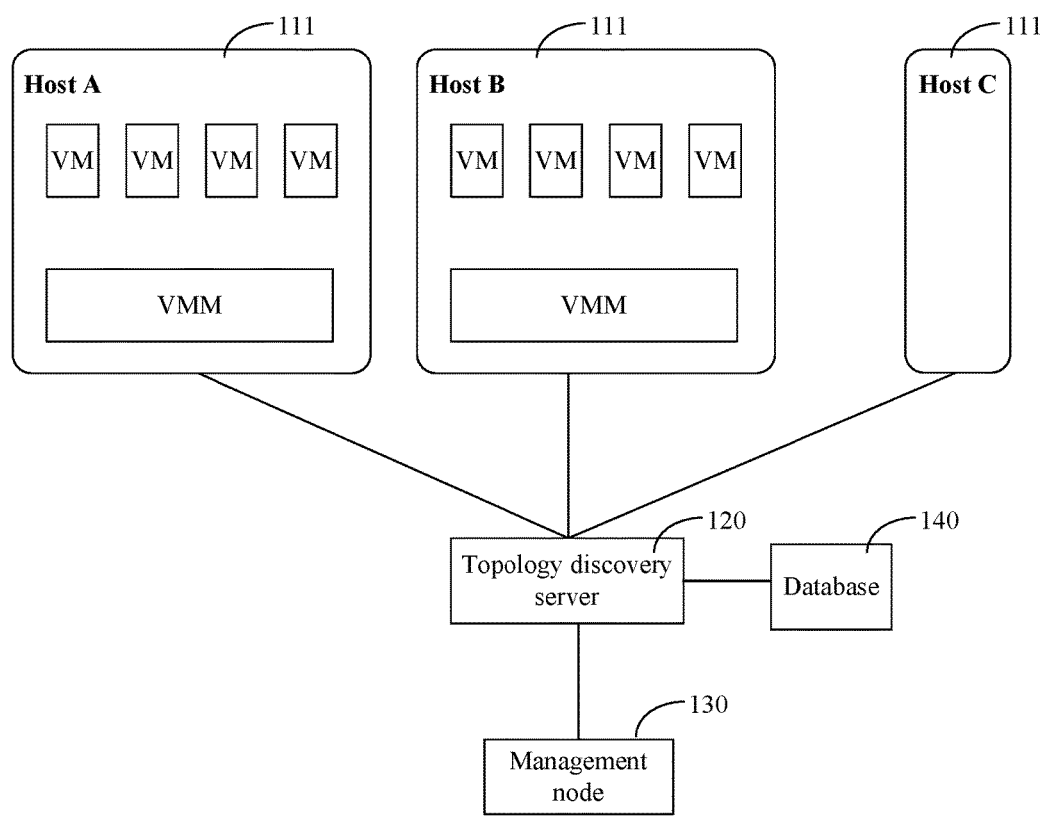
FIG. 1B is a schematic architecture diagram of another virtualization system according to an embodiment.

FIG. 1B is a schematic architecture diagram of another virtualization system according to an embodiment, and a difference from FIG. 1A lies in that a host 111 does not include a collection agent, and API calling information is stored in a log file or directly sent to a topology discovery server 120 by a VM, a virtual switch, or a VMM.

Figure 1C:
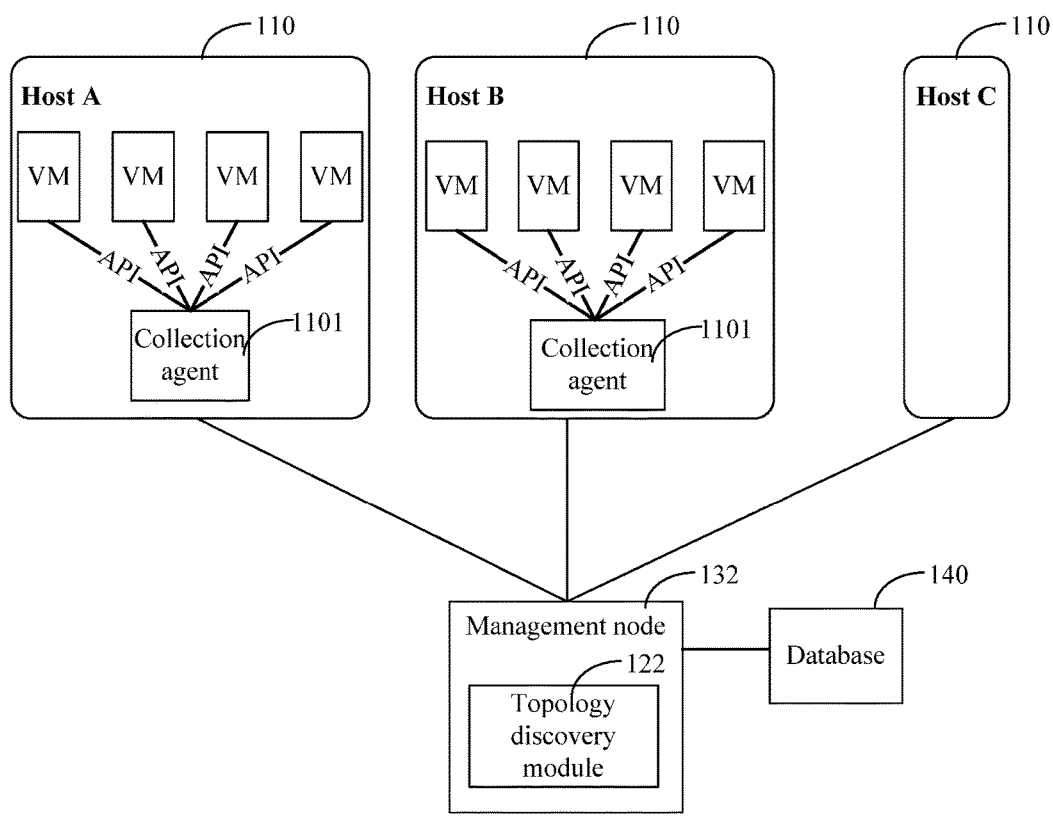
FIG. 1C is a schematic architecture diagram of still another virtualization system according to an embodiment.

FIG. 1C is a schematic architecture diagram of still another virtualization system according to an embodiment. In this case, a topology discovery server 120 and a management node 132 are jointly disposed, and functions of the foregoing topology discovery server 120 are implemented by a topology discovery module 122 in the management node.

Virtualization architectures provided in FIG. 1B and FIG. 1C are alternative embodiments based on that in FIG. 1A. Functions of components in the virtualization architectures are similar to those in FIG. 1A, can be adaptively modified according to changes of the architectures, and can also implement functions of reporting and analyzing API calling information. The functions of the components in FIG. 1B and FIG. 1C are not described repeatedly in the embodiments.

Virtual machines belonging to a same application topology cluster can be placed in a network covered by a same switch or a similar network, so as to reduce interaction time. If virtual machine clusters in a system need to be upgraded in batches, virtual machines of a same application topology cluster should be best upgraded in a same batch. Virtual machine clusters in an application topology relationship should be best placed in a same server or an adjacent server. The virtual machine clusters in an application topology relationship and corresponding backup clusters should be placed in different servers. Virtual machines having a topology relationship should also be migrated together, and the like. When a management node implementing the foregoing functions needs to use an application topology of a virtual machine, the application topology can be obtained from the topology discovery server.

Figure 2:
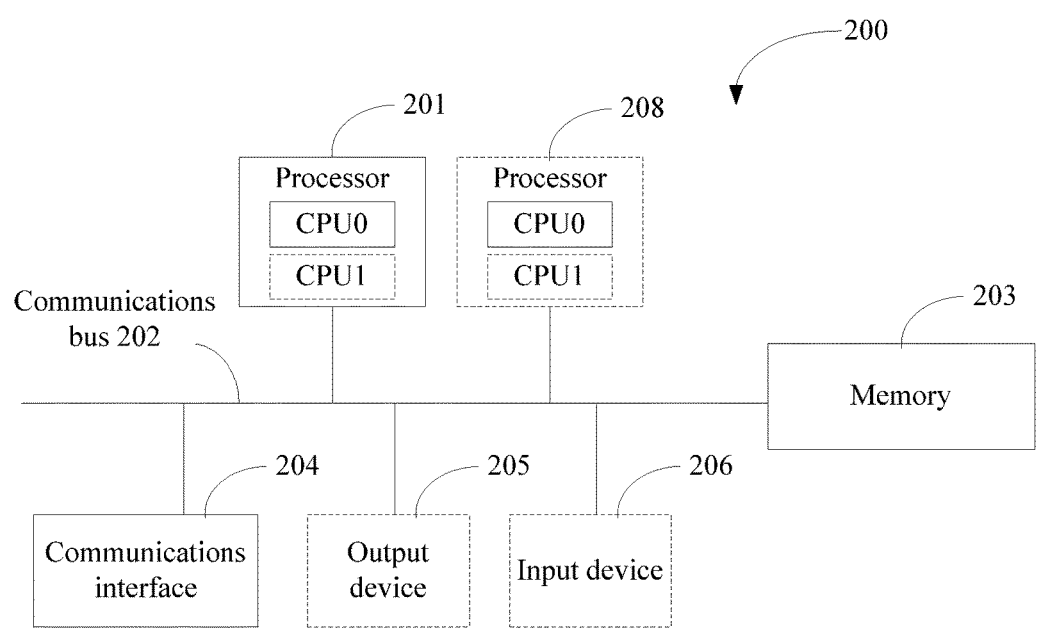
FIG. 2 is a schematic diagram of a computer device according to an embodiment.

A collection agent 1101 and a topology discovery server 120 can be implemented by using hardware/software. FIG. 2 is a schematic diagram of a computer device according to an embodiment. A computer device 200 includes at least one processor 201, a communications bus 202, a memory 203, and at least one communications interface 204.

The processor 201 may be a central processing unit (CPU), a microprocessor, an application-specific integrated circuit (ASIC), or one or more integrated circuits for controlling program execution in a solution.

The communications bus 202 may include one path for transferring information between the foregoing components. The communications interface 204 is an apparatus that uses any type of transceiver, and is configured to communicate with another device or a communications network, such as Ethernet, radio access network (RAN), or Wireless Local Area Networks (WLAN).

The memory 203 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM), or other compact disc storage, optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and can be accessed by a computer, which is not limited. The memory may exist independently, and is connected to the processor by using the bus. The memory may also be integrated with the processor.

The memory 203 is configured to store application program code for executing a solution, and is implemented by means of control of the processor 201. The processor 201 is configured to execute the application program code stored in the memory 203.

In specific implementation, as an embodiment, the processor 201 may include one or more CPUs, for example a CPU0 and a CPU1 in FIG. 2.

In specific implementation, as an embodiment, the computer device 200 may include multiple processors, for example the processor 201 and a processor 208 in FIG. 2. Each of the processors may be a single-core (single-CPU) processor, or may be a multi-core (multi-CPU) processor. The processor herein may refer to one or more devices, circuits, and/or processing cores configured to process data (for example, a computer program instruction).

In specific implementation, as an embodiment, the computer device 200 may further include an output device 205 and an input device 206. The output device 205 communicates with the processor 201, and can display information in multiple manners. For example, the output device 205 may be a liquid crystal display (LCD), a light emitting diode (LED) display device, a cathode ray tube (CRT) display device, a projector (projector), or the like. The input device 206 communicates with the processor 201, and can receive input of a user in multiple manners. For example, the input device 206 may be a mouse, a keyboard, a touchscreen device, a sensing device, or the like.

The foregoing computer device 200 may be a general-purpose computer device or a dedicated computer device. In specific implementation, the computer device 200 may be a desktop computer, a portable computer, a network server, a personal digital assistant (PDA), a mobile phone, a tablet computer, a wireless terminal device, a communications device, an embedded device, or a device with a similar structure in FIG. 2. This embodiment imposes no limitation on a type of the computer device 200.

The collection agent, the host, and the topology discovery server in FIG. 1A, FIG. 1B, and FIG. 1C may be the computing 200 device shown in FIG. 2. One or more software modules are stored in the memory to implement functions of the collection agent, the host, and the topology discovery server (for example, a function of analyzing API calling information in the topology discovery server). The collection agent, the host, and the topology discovery server can implement, by using the processor and the program code in the memory, a method for discovering an application topology between virtual machines.

It should be noted that the computer device shown in FIG. 2 provides merely a possible hardware implementation manner of parts in a system for discovering an application topology, and hardware components of the computer device can be added or removed according to a difference or a change of functions of the parts in the system, to match the functions of the parts in the system.

Figure 3A:
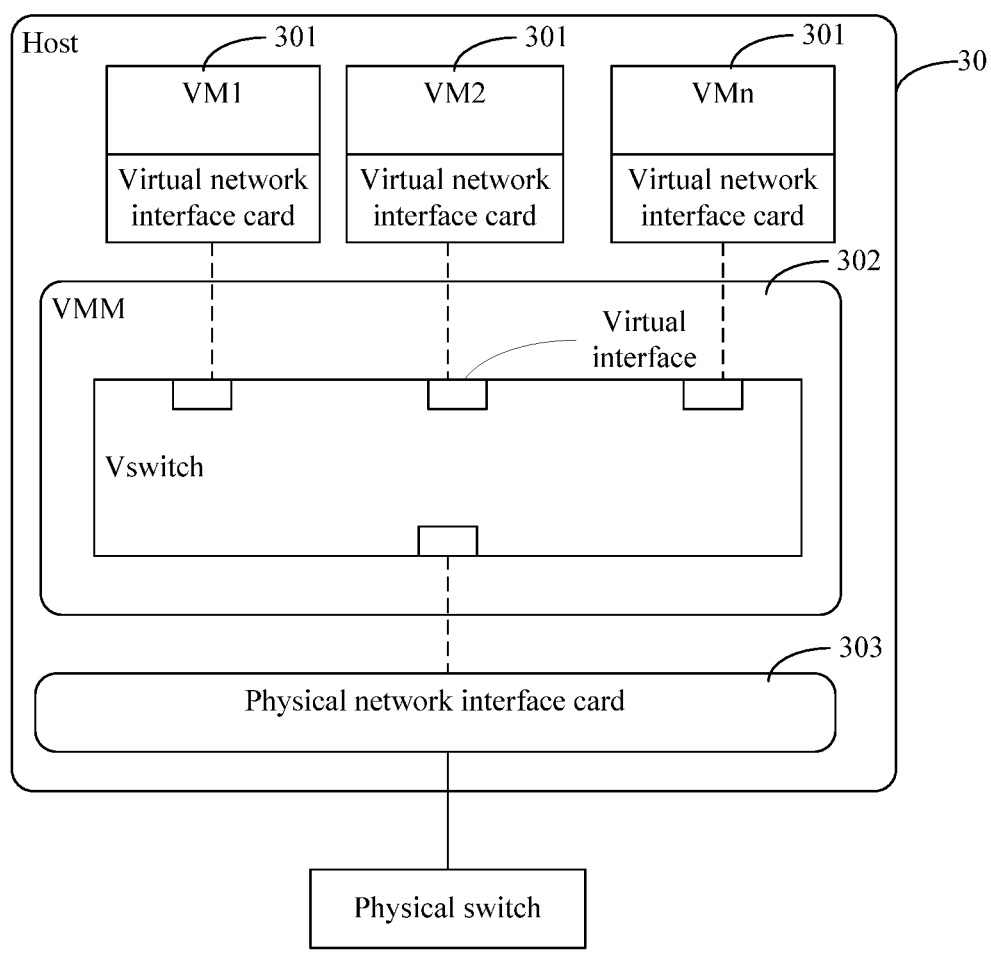
FIG. 3A is a schematic diagram of a virtualization structure in a host according to an embodiment.

FIG. 3A is a schematic diagram of a virtualization structure in a host 30 according to an embodiment. The host 30 is a physical server, a bottom layer of the physical server is a hardware layer, and the hardware layer mainly includes hardware resources such as a central processing unit (CPU), a memory, a hard disk, and a network interface card 303. Server virtualization refers to implementing a virtualized running environment of multiple virtual machines (VM) 301 in a physical server by using virtualization software (such as VMWare ESX and Citrix XEN). A software layer installed on the server to implement a virtualized environment is referred to as a VMM 302. The VMM running on the hardware layer is responsible for scheduling, allocating, and managing the hardware resources at the hardware layer. Multiple virtual machines VMs run on the VMM, and the VMM provides each virtual machine with a hardware environment such as a virtualized CPU, memory, storage, IO device (such as a network interface card), and an Ethernet switch, so as to ensure that the multiple virtual machines run in a manner of isolating from each other.

In a virtualized running environment, the VMM 302 creates a virtual network interface card (vNIC) for each virtual machine, and a virtual switch VSwitch provides a communication capability for virtual machines 301, and a virtual machine and an external network. For the VSwitch running in the VMM 302, a virtual network interface card for each virtual machine corresponds to a logical port of the VSwitch, and a physical network interface card of the host corresponds to a port connecting the VSwitch to an external physical switch.

A process of receiving a packet by a virtual machine is: the VSwitch receives an Ethernet packet from the physical network interface card, and forwards the packet according to a correspondence table (that is, a static MAC table) that is between a Media Access Control (MAC) address of a virtual machine and a logical port of the VSwitch and that is delivered by the VMM 302.

A process of sending a packet by a virtual machine 301 is: when a MAC address of the packet is in an external network, the VSwitch directly sends the packet to the external network from the physical network interface card; and when a destination MAC address of the packet is connected to a virtual machine of a same VSwitch, the VSwitch forwards the packet by using a static MAC table.

Figure 3B:
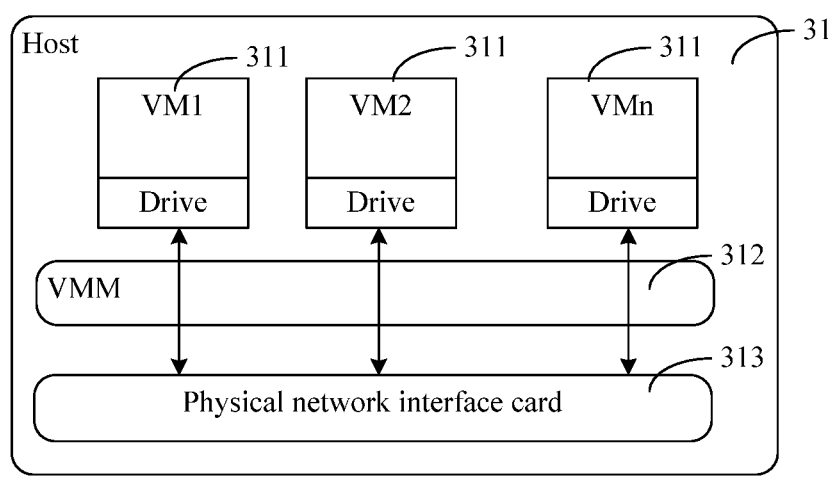
FIG. 3B is a schematic diagram of a virtualization structure in a host in a network interface card straight-through scenario according to an embodiment.
Figure 3C:
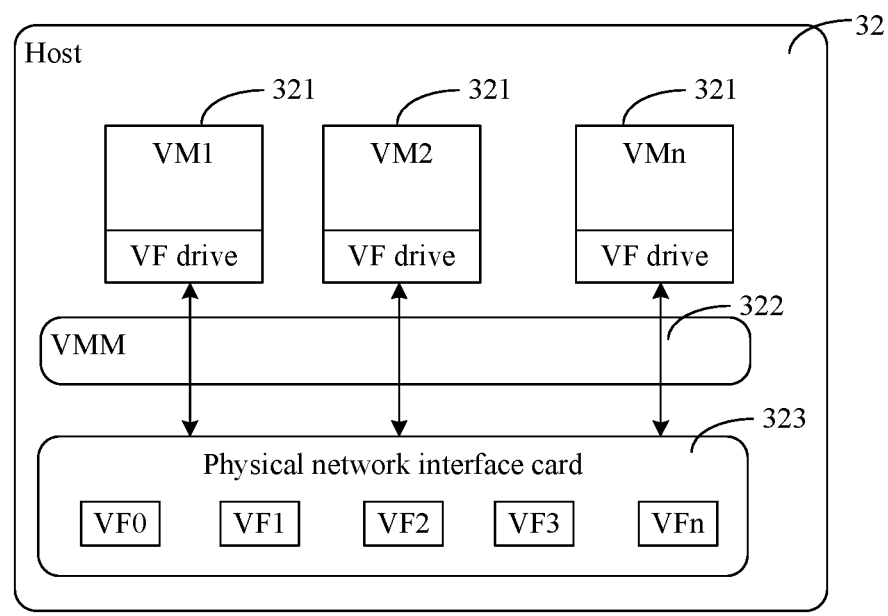
FIG. 3C is a schematic diagram of a virtualization structure in a host in another network interface card straight-through scenario according to an embodiment.

FIG. 3B is a schematic diagram of a virtualization structure in a host 31 in a network interface card straight-through scenario according to an embodiment. In this case, a physical network interface card 313 is not virtualized, and each egress port of the physical network interface card is allocated to one virtual machine. FIG. 3C is a schematic diagram of a virtualization structure in a host 32 in another network interface card straight-through scenario according to an embodiment. A difference from FIG. 3B lies in that, a physical network interface card 323 is virtualized into multiple virtual function devices (VF) by using a virtual machine 321, where the foregoing network interface card virtualization technologies may be single-root IO virtualization (SR-IOV) and multi-root IO virtualization (MR-IOV). The virtual function devices can share a physical resource (such as a network interface card port) of the physical network interface card, and the virtual function devices can also be correlated with a virtual machine system in the host 32.

The method for discovering an application topology relationship provided by the embodiments is also applicable to scenarios shown in FIG. 3B and FIG. 3C. In this case, a virtual machine (311; 321) may directly call an outbound interface of a physical network interface card (313; 323) to transmit a packet, so as to skip a virtual switch in a VMM (312; 322). An agent module may obtain API calling information from a virtual machine (311; 321) or the VMM (312; 322). For example, in a network interface card straight-through scenario, when the virtual machine calls an input API function to transmit a packet to the physical network interface card by using the VMM, the virtual machine or the VMM may record the API calling information in a log file or directly transmit the API calling information to a collection agent; or a collection agent monitors transmission of the packet among the virtual machine, the VMM, and the physical network interface card, and records the API calling information in a log file.

Figure 4:
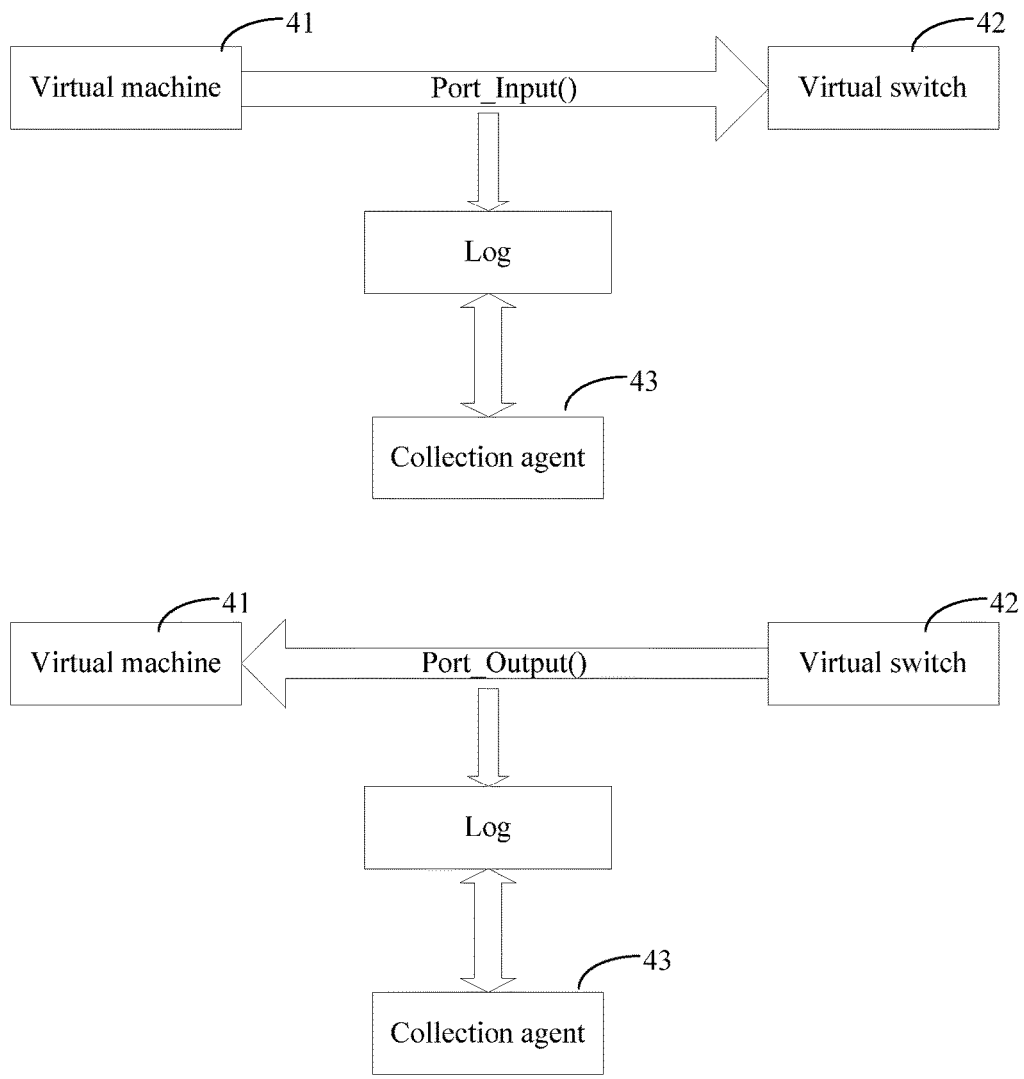
FIG. 4 is a schematic diagram of obtaining API calling information by a collection agent by means of active discovery according to an embodiment.
Figure 5:
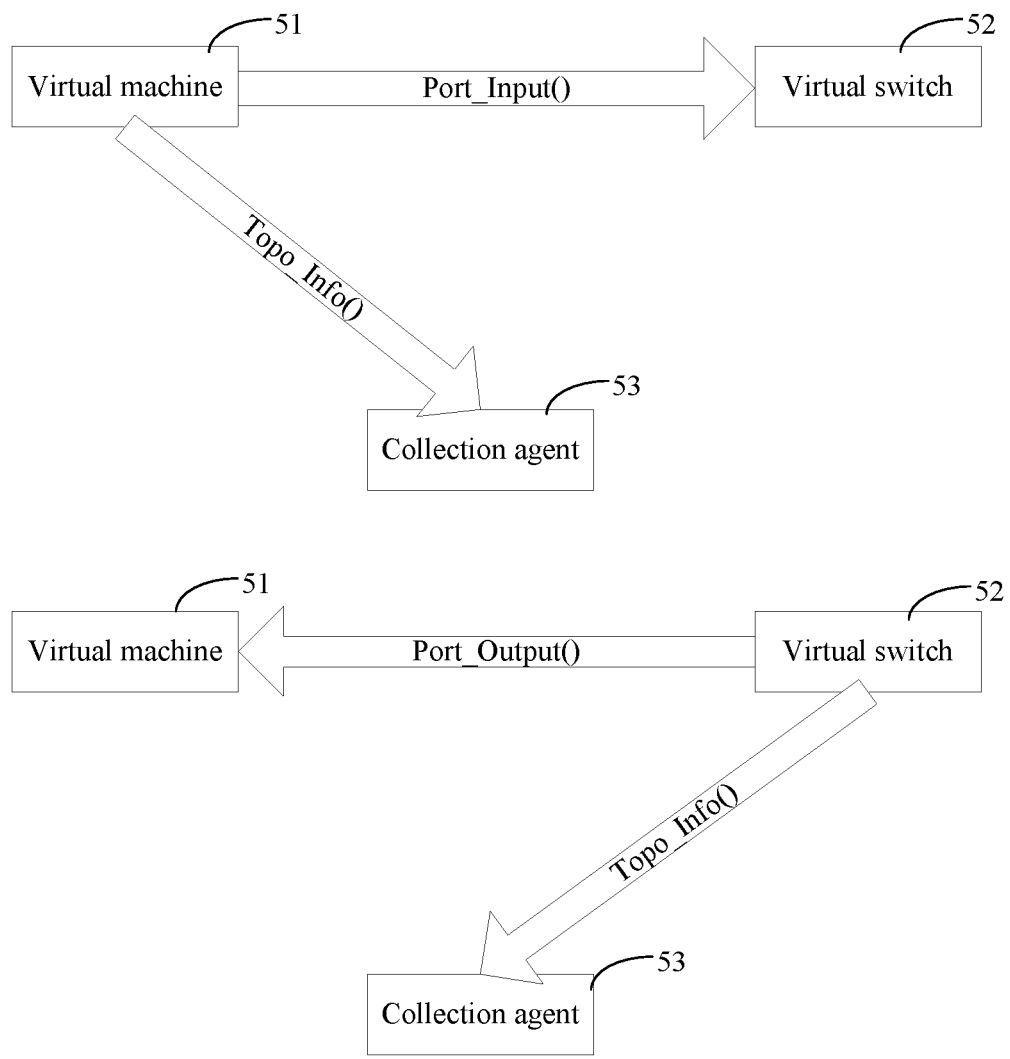
FIG. 5 is a schematic diagram of obtaining API calling information by a collection agent by means of passive discovery according to an embodiment.

The collection agent can collect the API calling information by two means: active discovery and passive discovery. FIG. 4 is a schematic diagram of obtaining API calling information by a collection agent 43 by means of active discovery according to an embodiment. FIG. 5 is a schematic diagram of obtaining API calling information by a collection agent 53 by means of passive discovery according to an embodiment. The active discovery refers to that when a virtual machine 41 calls an input API function (Port_Input API), the virtual machine 41, a virtual switch 42, or a VMM writes API calling information into a log file, or when a virtual switch 42 calls an output API function (Port_Output API), a virtual machine 41, the virtual switch 42, or a VMM writes API calling information into a log file, and a collection agent 43 may obtain the API calling information from the log file by scanning the log file; and the passive discovery refers to that a topology information report API function (Topo_Info_API) used for reporting API calling information to a collection agent 53 is added, and when a virtual machine 51 calls an input API function (Port_Input API) to transmit a packet by using a VMM, the virtual machine 51, a virtual switch 52, or the VMM calls the topology information report API function to send currently called API calling information to the collection agent 53, or when a virtual switch 52 calls an output API function (Port_Output API), a virtual machine 51, the virtual switch 52, or a VMM calls the topology information report API function to send currently called API calling information to the collection agent 53.

It should be noted that, for different operating systems, the foregoing input API function, output API function, and topology information report API function may be in different formats, which is not limited by this embodiment. Persons skilled in the art can understand that the foregoing functions can separately implement input, output, and reporting functions. API functions can be searched for by using an API function reference book. Exemplarily, Windows API Function Reference Manual published by Post & Telcom Press is a reference manual for a Microsoft Win32 API function; and for operating systems of other versions or types, corresponding input API functions and output API functions can also be searched for by using related reference books.

It should be further noted that storing API calling information in a log file is merely an example. The API calling information may also be stored in other files or other locations from which the collection agent can obtain the API calling information.

A topology discovery server collects API calling information from hosts, and each set of API calling information corresponds to one API call. In embodiments, the API call specifically includes an input API function call and an output API function call. A source virtual machine at a packet transmit end calls an input API function to transmit a packet to a VMM, the VMM transmits the packet to a VMM at a packet receive end through a network, and the VMM at the packet receive end calls an output API function to send the packet to a destination virtual machine. In the foregoing process, both a host at the packet transmit end and a host at the packet receive end record a set of API calling information, and each set of API calling information includes an identifier of a virtual machine corresponding to the API call, an occurrence time of the API call, and a packet flow direction of the API call; and may further include a communications protocol. The topology discovery server analyzes the collected API calling information. When a difference between occurrence times of the API calls in the two sets of API calling information is less than a predetermined threshold, and packet flow directions in the two sets of API calling information are mutually opposite (one is input and the other is output), an interaction relationship exists between two virtual machines corresponding to two identifiers of the virtual machines in the two sets of API calling information, so that interaction frequency of the two virtual machines is determined. If interaction frequency of the first virtual machine and the second virtual machine meets the second condition, it is determined that an application topology relationship exists between the first virtual machine and the second virtual machine. Specifically, the interaction frequency of the first virtual machine and the second virtual machine is determined, the interaction frequency is compared with predetermined frequency, and when the interaction frequency is greater than the predetermined frequency, it is determined that the interaction frequency meets the second condition. When the two virtual machines corresponding to the two identifiers of the virtual machines in the foregoing two sets of API calling information are different. The foregoing solution provides a method for discovering an application topology relationship between virtual machines in a virtualization scenario, where an application topology relationship between virtual machines is determined by analyzing API calling information generated in a packet transmission process, and therefore, complexity of the solution is relatively low.

Figure 6:
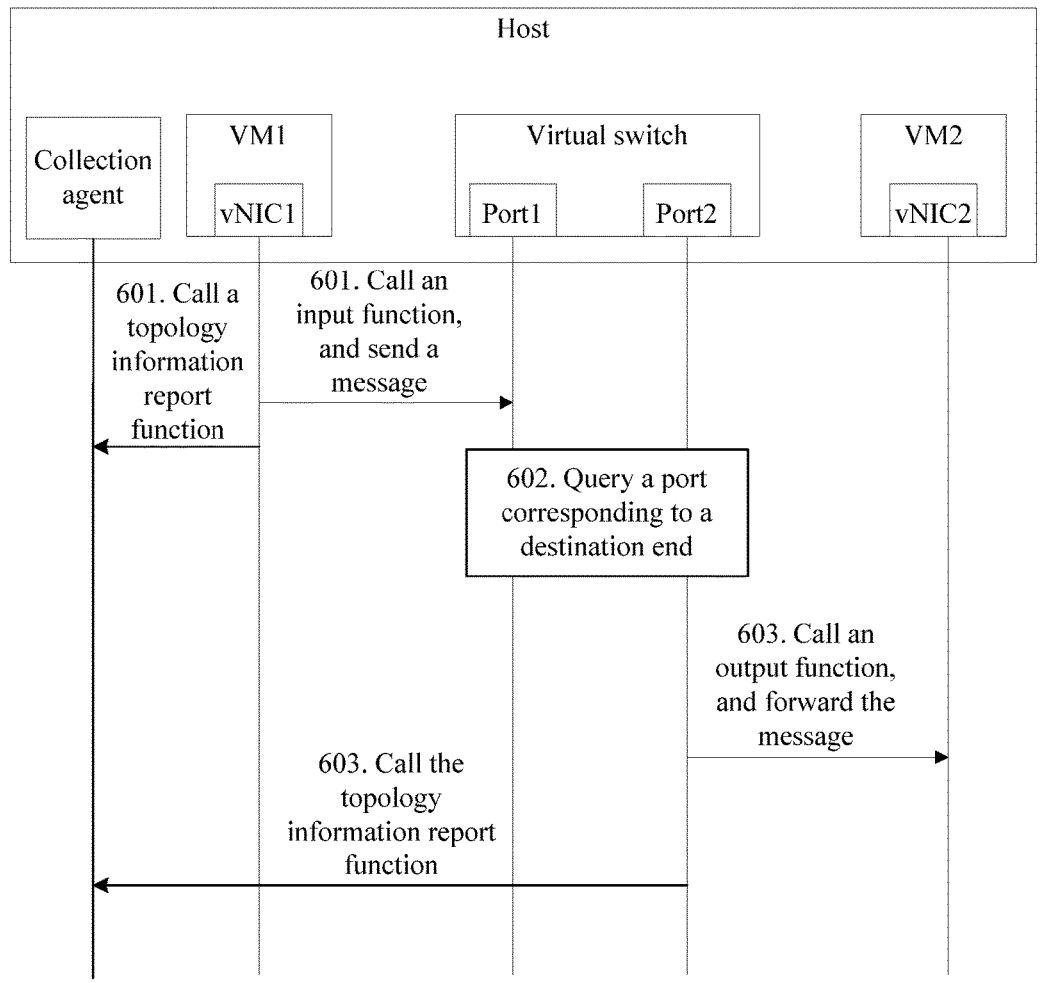
FIG. 6 is a schematic flowchart of obtaining, when two virtual machines in a same host communicate with each other, API calling information by a collection agent according to an embodiment.

With reference to the schematic diagram of a virtualization structure in a host shown in FIG. 3A, FIG. 6 is a schematic flowchart of obtaining, when two virtual machines in a same host communicate with each other, API calling information by a collection agent according to an embodiment. The collection agent runs in the host, and serves as a functional module of the host. A VM1 and a VM2 (two VMs are used as an example for description in this embodiment) run on the host, a virtual network interface card of the VM1 is a vNIC1, and a virtual network interface card of the VM2 is a vNIC2, a port, on a virtual switch, corresponding to the vNIC1 is a Port1, and a port, on the virtual switch, corresponding to the vNIC2 is a Port 2. It should be noted that allocating a virtual network interface card to a virtual machine and establishing a correspondence between a virtual network interface card and a port of a virtual switch are common technical means in the art, and a specific process thereof is not repeatedly described in this embodiment. A method shown in FIG. 6 includes:

Step 601: When the VM1 needs to send a packet to the VM2, the VM1 calls an input API function (Port_Input API) of a VMM, and sends the packet to the Port1 of the virtual switch by using the vNIC1.

Step 602: The virtual switch determines, by searching a static MAC table, destination MAC of the packet and determines that a port, of the virtual switch, corresponding to the VM2 is the Port 2.

In a possible manner, if the VM1 does not know an address of the VM2, the packet sent by the VM1 to the VM2 does not carry the address of the VM2. In this case, the virtual switch broadcasts the packet of the VM1, and sends the packet of the VM1 to all VMs of the virtual switch in a broadcast manner, and then the VM2 can receive the packet of the VM1 and returns a response.

Step 603: The virtual switch calls an output API function (Port_Output API), and sends the packet to the virtual network interface card vNIC2 of the VM2 through the Port2, and then the VM2 receives the packet sent by the VM1.

In step 601, since the VM1 needs to call the input API function, and one API call occurs, API calling information needs to be recorded, and the VM1 may record the API calling information in the following two manners:

Manner 1: The VM1 calls an interface between the VM1 and a collection agent, and reports the API calling information; and specifically, the VM1 calls a topology information report API function (Topo_Info API) of the collection agent, and sends the API calling information to the collection agent. It should be noted that this embodiment imposes no limitation on a time at which the VM1 sends the API calling information to the collection agent. Optionally, the VM1 may send the API calling information when network load is small.

Manner 2: The VM1 writes the API calling information into a log file, and the collection agent reads the API calling information. It should be noted that this embodiment imposes no limitation on a time at which the collection agent obtains the API calling information from the log file. Optionally, the collection agent may read periodically the API calling information from the log file or the VM1 instructs the collection agent to read the API calling information after writing the API calling information into the log file.

Still further, in addition to recording the API calling information by a VM, a virtual switch or the VMM can also record the API calling information. Specifically, the virtual switch or the VMM writes the API calling information into the log file or sends the API calling information to the collection agent when receiving the packet sent by the VM1.

The API calling information includes an identifier of a virtual machine, an occurrence time of an API call, a communications protocol, and a packet flow direction. Optionally, identifiers of virtual machines in the API calling information may include an identifier of a source virtual machine and an identifier of a destination virtual machine. In this case, it can be directly identified, according to merely one piece of API calling information, that one time of interaction occurs between the source virtual machine and the destination virtual machine. It should be noted that when the VM1 knows an address of the communication peer end VM2, the recorded API calling information may include the identifier of the source virtual machine and the identifier of the destination virtual machine. The foregoing communications protocol may be the HTTP protocol, the TCP/IP protocol, the UDP protocol, or the like.

In step 603, since the virtual switch calls the output API function (Port_Output API), and one API call occurs, API calling information needs to be recorded. Similar to the VM1, the virtual switch may also record the API calling information in the following two manners:

Manner 1: The virtual switch calls an interface between the virtual switch and a collection agent, and reports the API calling information; and specifically, the virtual switch calls a topology information report API function (Topo_Info API) of the collection agent, and sends the API calling information to the collection agent. It should be noted that this embodiment imposes no limitation on a time at which the virtual switch sends the API calling information to the collection agent. The topology information report API function can be implemented by using a HOOK function or modifying code, as long as transmission of the API calling information can be provided.

Manner 2: The virtual switch writes the API calling information into a log file, and the collection agent reads the API calling information. It should be noted that this embodiment imposes no limitation on a time at which the collection agent obtains the API calling information from the log file.

Still further, in step 603, in addition to the virtual switch, the API calling information may also be recorded by a virtual machine (VM2) or the VMM, which is not repeatedly described in this embodiment.

Figure 7:
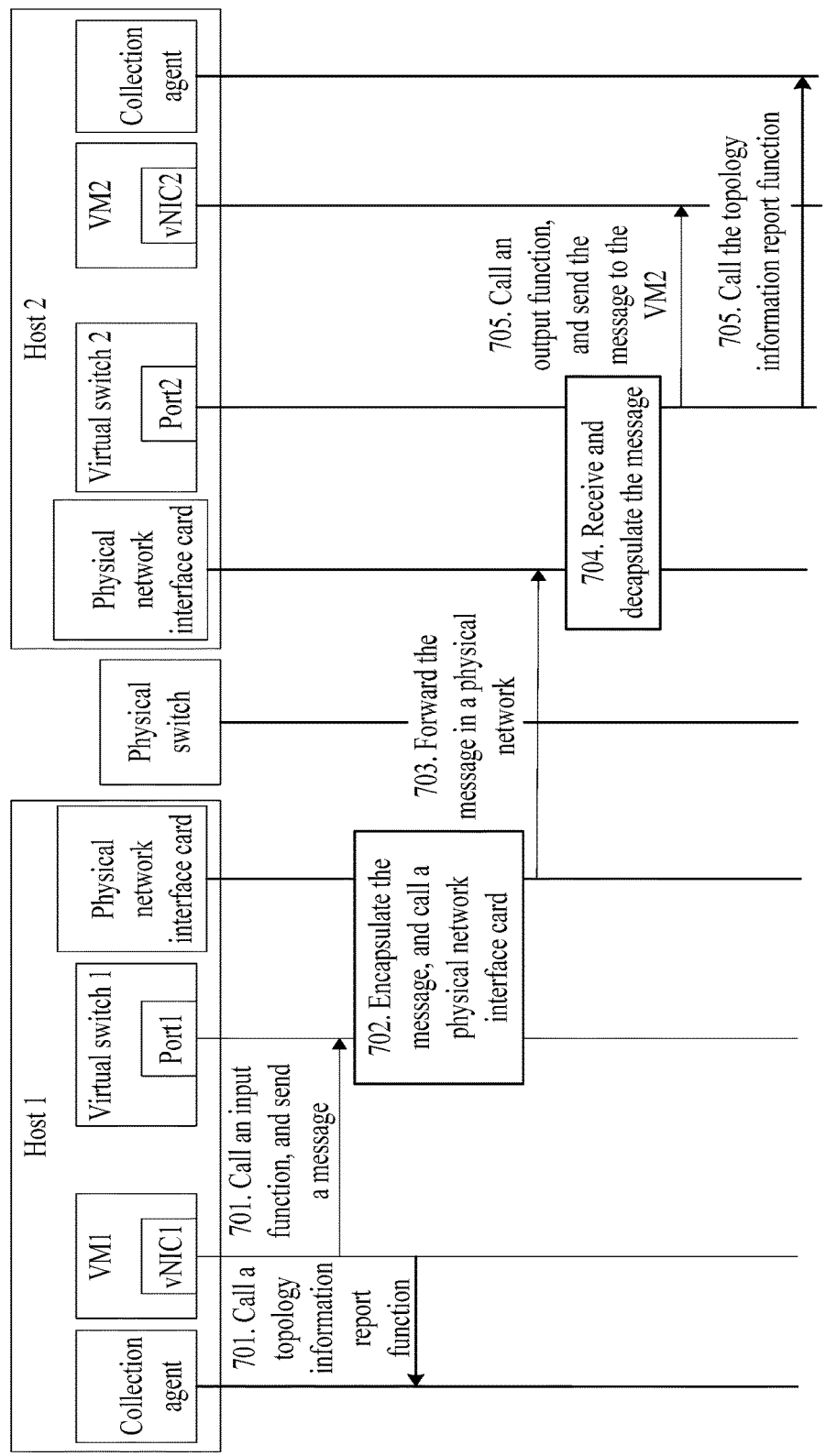
FIG. 7 is a schematic flowchart of obtaining, when two virtual machines in different hosts communicate with each other, API calling information by a collection agent according to an embodiment.

The method shown in FIG. 6 provides a process of obtaining, when two virtual machines in a same host communicate with each other, API calling information by a collection agent. With reference to the schematic diagram of a virtualization structure shown in FIG. 3A, FIG. 7 is a schematic flowchart of obtaining, when two virtual machines in different hosts communicate with each other, API calling information by a collection agent according to an embodiment. The two hosts may use the virtualization structure shown in FIG. 3A, and the hosts are connected by a physical switch. A VM1 and a virtual switch 1 run on a host 1, a VM2 and a virtual switch 2 (two VMs are used as an example for description in this embodiment) run on a host 2, a virtual network interface card of the VM1 is a vNIC1, and a virtual network interface card of the VM2 is a vNIC2, a port, on the virtual switch 1, corresponding to the vNIC1 is a Port1, and a port, on the virtual switch 2, corresponding to the vNIC2 is a Port 2. It should be noted that allocating a virtual network interface card to a virtual machine and establishing a correspondence between a virtual network interface card and a port of a virtual switch are common technical means in the art, and a specific process thereof is not repeatedly described in this embodiment. A method shown in FIG. 7 includes:

Step 701: When the VM1 needs to send a packet to the VM2, the VM1 calls an input API function (Port_Input API) of a VMM, and sends the packet to the Port1 of the virtual switch 1 by using the vNIC1.

Step 702: The virtual switch 1 receives the packet on the port1, and determines a destination MAC address and an external network of the packet, and then the virtual switch 1 sends the packet to the external network by using a physical network interface card of the host 1.

Step 703: The packet is routed, according to an existing packet forwarding rule, to a physical network interface card of the host2 in which the VM2 is located.

Step 704: The host 2 receives the packet by using the physical network interface card of the host 2.

Step 705: The virtual switch 2 determines that a port corresponding to the VM2 is the Port2, and the virtual switch 2 sends the packet to the virtual network interface card vNIC2 of the VM2 through the port Port2; and then the VM2 receives the packet sent by the VM1.

It should be noted that, in the foregoing packet transmission process, the packet may be encapsulated and de-capsulated according to an existing rule, which is not repeatedly described in this embodiment.

In step 701, the VM1 records the API calling information in a manner similar to that defined in step 601. A collection agent of the host 1 obtains the API calling information.

In step 705, the virtual switch 2 records the API calling information in a manner similar to that defined in step 603. A collection agent of the host 2 obtains the API calling information.

It should be noted that, a distributed virtual switch may be used in this embodiment, the distributed virtual switch may span multiple hosts, so that virtual machines on the multiple hosts are like connected to a same virtual switch, and the virtual machines may be migrated between the foregoing multiple hosts, or multiple distributed virtual switches may exist on one host. When a distributed virtual switch is used, a manner of obtaining API calling information by a collection agent is similar to that in the foregoing, which is not repeatedly described in the predetermined application.

In terms of the method processes shown in FIG. 6 and FIG. 7, when a host does not include a collection agent, a virtual machine or a virtual switch may report API calling information directly to a topology discovery server in manners defined in FIG. 6 and FIG. 7.

According to the method for discovering an application topology relationship provided by this application, in a packet transmission process, API calling information is recorded, and whether interaction exists between two virtual machines corresponding to two sets of API calling information is determined by matching whether the two sets of API calling information meet a first condition. By using the foregoing manner, a topology discovery server may determine interaction frequency, involved in collected API calling information, of virtual machines, and an application topology relationship between the virtual machines is determined according to the interaction frequency of the virtual machines. The foregoing solution provides a method for discovering an application topology relationship between virtual machines in a virtualization scenario, where API calling information needs to be recorded by only two ends that perform packet transmission, and therefore, complexity of the solution is relatively low.

Figure 8:
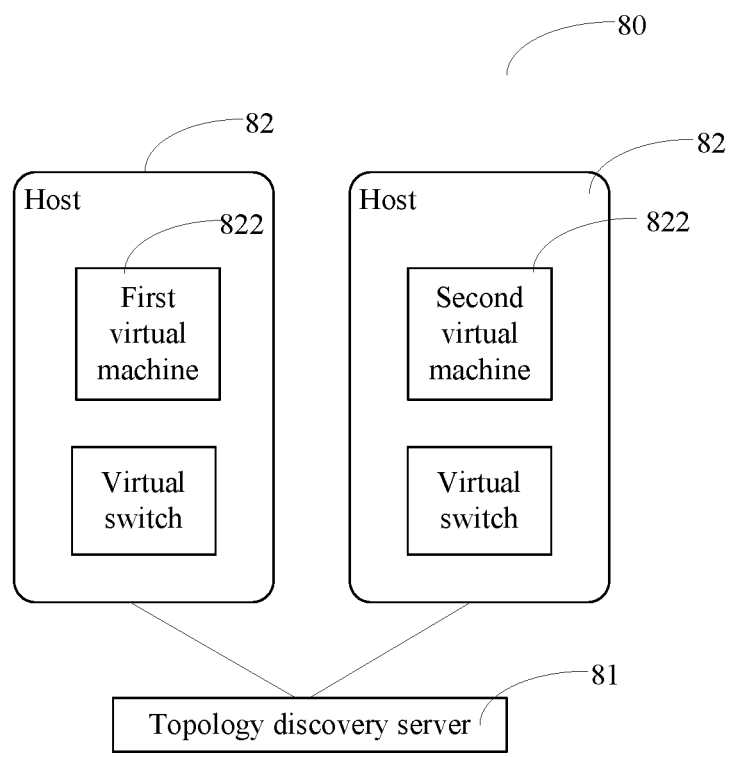
FIG. 8 is a schematic structural diagram of a system for discovering an application topology relationship according to an embodiment.

FIG. 8 shows a system for discovering an application topology relationship according to an embodiment, where the system 80 includes a topology discovery server 81 and at least one host 82, and multiple virtual machines run on the at least one host 82.

When a virtual machine 822 of the multiple virtual machines sends a packet or a VMM on the at least one host 82 forwards a packet to a virtual machine 822 of the multiple virtual machines, application programming interface API calling information is generated.

The topology discovery server 81 is configured to collect at least two sets of application programming interface API calling information, where each set of API calling information corresponds to one API call, and each set of API calling information includes an identifier of a virtual machine corresponding to the API call, an occurrence time of the API call, and a packet flow direction of the API call.

The topology discovery server 81 is further configured to analyze the at least two sets of API calling information, and determine first API calling information and second API calling information that meet a first condition, where that the first API calling information and the second API calling information meet the first condition includes: a packet flow direction in the first API calling information and a packet flow direction in the second API calling information are mutually opposite, and a difference between an occurrence time of an API call in the first API calling information and an occurrence time of an API call in the second API calling information is less than or equal to a predetermined threshold.

The topology discovery server 81 is further configured to determine whether interaction frequency of a first virtual machine 822 indicated by the first API calling information and a second virtual machine 822 indicated by the second API calling information meets a second condition, and if it is determined that the interaction frequency of the first virtual machine 822 and the second virtual machine 822 meets the second condition, determine that an application topology relationship exists between the first virtual machine 822 and the second virtual machine 822.

Further, each set of API calling information further includes a communications protocol; and correspondingly, that the first API calling information and the second API calling information meet the first condition further includes: a communications protocol in the first API calling information and a communications protocol in the second API calling information are the same.

The topology discovery server 81 is specifically configured to analyze at least two sets of API calling information in the first virtual machine 822 and at least two sets of API calling information in the second virtual machine 822, determine the interaction frequency of the first virtual machine 822 and the second virtual machine 822, compare the interaction frequency with predetermined frequency, and when the interaction frequency is greater than the predetermined frequency, determine that the interaction frequency meets the second condition.

The topology discovery server 81 is specifically configured to determine whether the first virtual machine 822 and the second virtual machine 822 are in a same network segment, and when the first virtual machine 822 and the second virtual machine 822 are in the same network segment, correct one of the interaction frequency or the predetermined frequency according to a predetermined weighting coefficient, compare corrected interaction frequency with the predetermined frequency; or compare the interaction frequency with corrected predetermined frequency.

The topology discovery server 81 is specifically configured to separately read the at least two sets of API calling information from a log file in the deployed host 82 of the multiple virtual machines; or the topology discovery server 81 is specifically configured to receive the at least two sets of API calling information reported by an agent module in the deployed host of the multiple virtual machines.

Further, the API call includes an input API function call and an output API function call.

The system 80 for discovering an application topology further includes:

the virtual machine 822, further configured to: when an API is called to send a packet to a VMM in which the virtual machine 822 is located or to receive a packet forwarded by the VMM, write API calling information into a log file in the deployed host 82 of the virtual machine 822; or an agent module in the deployed host of the virtual machine 822, configured to write API calling information corresponding to an API call in a packet transmission process into a log file in the deployed host 82 of the virtual machine 822.

Figure 9:
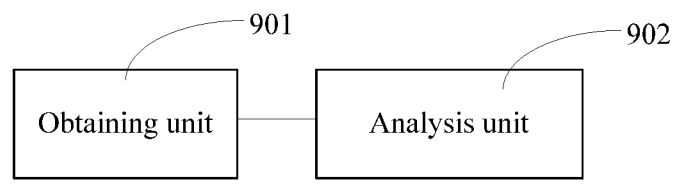
FIG. 9 is a schematic structural diagram of a topology discovery server according to an embodiment.

Corresponding to the foregoing system, as shown in FIG. 9, FIG. 9 shows a topology discovery server according to an embodiment, where the topology discovery server includes:

an obtaining unit 91, configured to collect at least two sets of application programming interface API calling information, where each set of API calling information corresponds to one API call, and each set of API calling information includes an identifier of a virtual machine corresponding to the API call, an occurrence time of the API call, and a packet flow direction of the API call; and an analysis unit 92, configured to analyze the at least two sets of application programming interface API calling information, and determine first API calling information and second API calling information that meet a first condition, where that the first API calling information and the second API calling information meet the first condition includes: a packet flow direction in the first API calling information and a packet flow direction in the second API calling information are mutually opposite, and a difference between an occurrence time of an API call in the first API calling information and an occurrence time of an API call in the second API calling information is less than or equal to a predetermined threshold.

The analysis unit 92 is further configured to determine whether interaction frequency of a first virtual machine indicated by the first API calling information and a second virtual machine indicated by the second API calling information meets a second condition; and if the interaction frequency of the first virtual machine and the second virtual machine meets the second condition, determine that an application topology relationship exists between the first virtual machine and the second virtual machine.

Further, each set of API calling information further includes a communications protocol; and correspondingly, that the first API calling information and the second API calling information meet the first condition further includes: a communications protocol in the first API calling information and a communications protocol in the second API calling information are the same.

The analysis unit 92 is specifically configured to analyze at least two sets of API calling information in the first virtual machine and at least two sets of API calling information in the second virtual machine, determine the interaction frequency of the first virtual machine and the second virtual machine, compare the interaction frequency with predetermined frequency, and when the interaction frequency is greater than the predetermined frequency, determine that the interaction frequency meets the second condition.

The analysis unit 92 is specifically configured to determine whether the first virtual machine and the second virtual machine are in a same network segment, and when the first virtual machine and the second virtual machine are in the same network segment, correct one of the interaction frequency or the predetermined frequency according to a predetermined weighting coefficient.

The analysis unit 92 is specifically configured to compare corrected interaction frequency with the predetermined frequency; or compare the interaction frequency with corrected predetermined frequency.

The obtaining unit 91 is specifically configured to separately read the at least two sets of API calling information from a log file in a deployed host of the multiple virtual machines; or the obtaining unit 91 is specifically configured to receive the at least two sets of API calling information reported by an agent module in a deployed host of the multiple virtual machines.

The API call includes an input API function call and an output API function call.

According to the method, the apparatus, and the system for discovering an application topology relationship provided by this embodiment, API calling information in a packet transmission process is collected, and whether interaction exists between two virtual machines corresponding to two sets of API calling information is determined by matching whether the two sets of API calling information meet a first condition. By using the foregoing manner, a topology discovery server may determine interaction frequency, involved in the collected API calling information, of virtual machines, and an application topology relationship between the virtual machines is determined according to the interaction frequency of the virtual machines. The foregoing solution provides a method for discovering an application topology relationship between virtual machines in a virtualization scenario, where an application topology relationship between virtual machines is determined by analyzing API calling information generated in a packet transmission process, and therefore, complexity of the solution is relatively low.

In the embodiments corresponding to FIG. 8 and FIG. 9, the virtual machine, a collection agent, a virtual switch, and the topology discovery server are presented in a form of a functional unit/functional module. The "unit/module" herein may refer to an application-specific integrated circuit (ASIC), a circuit, a processor configured to execute one or more software or firmware programs and a memory, an integrated logic circuit, and/or another device that can provide the foregoing functions. In a simple embodiment, persons skilled in the art can think of that a virtual machine, a collection agent, a virtual switch, and a topology discovery server can use a form shown in FIG. 2. For example, the obtaining unit 901 and a processing unit 902 can be implemented by using the processor and the memory in FIG. 2.

An embodiment further provides a computer storage medium, where the computer storage medium is configured to store a computer software instruction used by the devices shown in FIG. 8 and FIG. 9, and includes a program designed to execute the foregoing method embodiments. A method for discovering an application topology relationship can be implemented by executing the stored program.

Although the present invention is described herein with reference to the embodiments, in a process of implementing the present invention required to be protected, persons skilled in the art can understand and implement other changes of the disclosed embodiments by viewing the accompanying drawings, disclosed content, and the appended claims.

Persons skilled in the art should understand that the embodiments may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. A computer program is stored/distributed in an appropriate medium, and is provided with other hardware or serves as a part of hardware, and may also use other distribution manners, such as by using Internet or another wired or wireless telecommunications system.

The present invention is described with reference to the flowcharts and/or block diagrams of the method, the apparatus (device), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the embodiments are described with reference to specific features and its embodiments, various modifications and combinations can be made without departing from the spirit and scope of the present disclosure. Correspondingly, the specification and accompanying drawings are merely an exemplary description defined by the appended claims, and are deemed to cover any and all modifications, alterations, combinations, or equivalence in the scope of the present disclosure. Obviously, persons skilled in the art can make various modifications and variations to the present invention without departing from the spirit and scope of the present disclosure. The present invention is intended to cover these modifications and variations provided that they fall within the scope of protection defined by the following claims and their equivalent technologies.

What is claimed is:

1. A method for discovering an application topology relationship between virtual machines, wherein the method comprises:
    sending, by a first virtual machine on a first host via a first virtual network interface card (NIC), a plurality of packets to a first virtual switch by calling an input application programming interface (API) function of a virtual machine monitor (VMM);
    recording at the first host first sets of API calling information, wherein each first set of API calling information corresponds to one API call and comprises an identifier of the first virtual machine, an occurrence time of the API call, and a packet flow direction of the API call;
    receiving, by a second virtual machine on a second host via a second virtual network interface card (NIC), a plurality of packets from a second virtual switch;
    recording at the second host second sets of API calling information, wherein each second set of API calling information corresponds to one API call and comprises an identifier of the second virtual machine, an occurrence time of the API call, and a packet flow direction of the API call;
    analyzing, by a topology discovery server, recorded sets of API calling information to identify that the recorded sets of API calling information meet a first condition, wherein the recorded sets of API calling information meet the first condition when a packet flow direction in a first set of API calling information and a packet flow direction in a second set of API calling information are mutually opposite, and a difference between an occurrence time of an API call in the first set of API calling information and an occurrence time of an API call in the second set of API calling information satisfies a first threshold;
    determining, by the topology discovery server, that an interaction frequency of the first virtual machine indicated by the first sets API calling information and the second virtual machine indicated by the second sets API calling information meets a second condition;
    determining, by the topology discovery server, that an application topology relationship exists between the first virtual machine and the second virtual machine based on the first and second conditions being met; and
    migrating the first virtual machine and the second virtual machine together into a network covered by a same switch based on the application topology relationship.

2. The method according to claim 1, wherein each set of API calling information further comprises a communications protocol, and wherein determining that the first condition is met further comprises:
    determining that a communications protocol in the first set of API calling information and a communications protocol in the second set of API calling information are the same.

3. The method according to claim 1, wherein determining that the interaction frequency of the first virtual machine and the second virtual machine meets the second condition comprises:
    analyzing recorded sets of API calling information of the first virtual machine and the second virtual machine;
    determining the interaction frequency of the first virtual machine and the second virtual machine based on the analysis; and
    comparing the interaction frequency with a first frequency, and when the interaction frequency is greater than the first frequency, determining that the interaction frequency meets the second condition.

4. The method according to claim 3, wherein before comparing the interaction frequency with the first frequency, the method further comprises:
    determining whether the first virtual machine and the second virtual machine are in a same network segment, and when the first virtual machine and the second virtual machine are in the same network segment, correcting one of the interaction frequency or the first frequency according to a weighting coefficient; and
    wherein comparing the interaction frequency with first frequency comprises:
        comparing corrected interaction frequency with the first frequency; or comparing the interaction frequency with corrected first frequency.

5. The method according to claim 1, wherein recording the first sets and the second sets of the API calling information comprises:
    obtaining API calling information from a log file of the first host and the second host.

6. The method according to claim 1, wherein recording the first sets and the second sets of API calling information comprises:
    receiving API calling information from the first host and the second host.

7. The method according to claim 6, further comprising: before receiving the API calling information from the first host and the second host,
    monitoring a transmission process of a packet in the first host and the second host, and recording API calling information corresponding to an API call in the transmission process.

8. The method according to claim 6, further comprising: before receiving the API calling information from the first host and the second host, receiving API calling information that corresponds to an API call in a packet transmission process in the first host and the second host and that is sent by one of the identified virtual machines, a virtual switch, or a virtual machine monitor (VMM).

9. A system for discovering an application topology relationship between virtual machines, wherein the system comprises a topology discovery server and at least one host having a plurality of virtual machines;
the host comprises a first processor and a first memory, wherein the first memory stores instructions, which when executed by the first processor, cause the host to:
send a plurality of packets from a first virtual machine to a first virtual switch by calling an input application programming interface (API) function of a virtual machine monitor (VMM) via a first virtual network interface card (NIC);
record first sets of API calling information, wherein each first set of API calling information corresponds to one API call and comprises an identifier of the first virtual machine, an occurrence time of the API call, and a packet flow direction of the API call;
receive a plurality of packets from a second virtual switch by using an output API function for a second virtual machine via a second virtual network interface card (NIC);
record second sets of API calling information, wherein each second set of API calling information corresponds to one API call and comprises an identifier of the second virtual machine, an occurrence time of the API call, and a packet flow direction of the API call;
the topology discovery server comprises a second processor and a second memory, wherein the second memory stores instructions, which when executed by the second processor, cause the topology discovery server to:
analyze recorded sets of API calling information to identify that the recorded sets of API calling information meet a first condition when a packet flow direction in a first set of API calling information and a packet flow direction in a second set of API calling information are mutually opposite, and a difference between an occurrence time of an API call in the first set of API calling information and an occurrence time of an API call in the second set of API calling information satisfies a first threshold;
determine that an interaction frequency of the first virtual machine indicated by the first sets of API calling information and the second virtual machine indicated by the second sets of API calling information meets a second condition, and determine that an application topology relationship exists between the first virtual machine and the second virtual machine based on the first and second conditions being met; and
migrate the first virtual machine and the second virtual machine together into a network covered by a same switch based on the application topology relationship.

10. The system according to claim 9, wherein each set of API calling information further comprises a communications protocol wherein the topology discover server is further configured to determine that the first condition is met when a communications protocol in the first set of API calling information and a communications protocol in the second set of API calling information are the same.

11. The system according to claim 9, wherein
the topology discovery server is further configured to analyze recorded sets of API calling information of the first virtual machine and the second virtual machine, determine the interaction frequency of the first virtual machine and the second virtual machine based on the analysis, and compare the interaction frequency with first frequency, and when the interaction frequency is greater than the first frequency, determine that the interaction frequency meets the second condition.

12. The system according to claim 9, wherein
the topology discovery server is further configured to determine whether the first virtual machine and the second virtual machine are in a same network segment, and when the first virtual machine and the second virtual machine are in the same network segment, correct one of the interaction frequency or the preset frequency according to a weighting coefficient, and compare corrected interaction frequency with the first frequency; or compare the interaction frequency with corrected first frequency.

13. The system according to claim 9, wherein
the topology discovery server is further configured to obtain API calling information from a log file of the host of the identified virtual machines.

14. The system according to claim 9, wherein
the topology discovery server is further configured to receive API calling information from the host of the identified virtual machines.

* * * * *